Feb. 3, 1953     O. T. HAINKE ET AL     2,627,217
PROTECTING HOOD FOR IMPLEMENT DRIVERS

Filed July 5, 1949     2 SHEETS—SHEET 1

INVENTORS.
Oscar T. Hainke
Cleo E. Lieurance
BY
ATTORNEY

INVENTORS.
Oscar T. Hainke
Cleo E. Lieurance
BY
ATTORNEY.

Patented Feb. 3, 1953

2,627,217

UNITED STATES PATENT OFFICE 2,627,217

PROTECTING HOOD FOR IMPLEMENT DRIVERS

Oscar T. Hainke and Cleo E. Lieurance, Enid, Okla.

Application July 5, 1949, Serial No. 103,004

3 Claims. (Cl. 98—1)

This invention relates to structure for protection against the sun and other elements and particularly to an umbrella-like assembly that is adapted for use with farm implements, such as combines, wherein the operator is almost continuously aggravated with dust accumulation having a tendency to center about the platform upon which he operates.

It is the primary object of the present invention to provide a hood-like structure mounted upon an upright standard above the position of an operator of a farm implement, the structure being in turn provided with means for directing a current of filtered air downwardly toward the operator not only for the purpose of coolness but more particularly to evacuate the space around the platform of undesirable dust.

The most important object of the present invention is to provide a protecting hood of the aforementioned type wherein a canvas or other flexible cover is supported in a frusto-conical manner and provided with an air intake at the apex thereof, there being means adjacent the intake for directing a current of air downwardly into the hood and thence around the machine operator to be protected.

Another object of the present invention is to provide means within the aforesaid hood adjacent the air inlet opening for confining the current of air within a predetermined path of travel.

A further object of the present invention is to provide a protecting hood as above set forth wherein the inlet opening of the cover itself has a dome-shaped filter member in communication therewith exteriorly of the hood for cleaning the incoming air prior to reaching the operator.

Other objects include the way in which the supporting standard is rendered extensible whereby the hood may be adapted for other uses; the manner of providing a quickly releasable attaching means for the canvas cover as well as the filter itself; and other more minor details of construction capable of rendering the device sturdy, inexpensive and highly efficient for its intended purposes.

It is common knowledge to those who have had experience operating agricultural implements that the dust factor is one of the most harassing problems. A farm implement operator is not particularly concerned about the heat of the sun or even rain and other elements; but the constant breathing of various types of dusts always proves to be a health damaging factor. Various attempts have heretofore been made to provide umbrellas, for instance, particularly adapted to be used on farm implements; and, while such structures are helpful in protection against the sun, for the most part use thereof has been abandoned. The reason for such abandonment of a protecting umbrella lies in the fact that the same enhances the collection of dust adjacent thereto. In any event, when an umbrella-like protecting means is used, dust that is collected adjacent the operator and within the umbrella does not have the opportunity to escape and, therefore, makes the operating conditions worse than if no protection means is used at all.

As will hereinafter appear, the structure forming the subject matter hereof removes the above-mentioned difficulties, permits the use of an umbrella for protecting the operator against the heat of the sun, and not only keeps the air about the operator clear of dust but feeds a constant supply of filtered air to the operator and, at the same time, lends an element of coolness.

Figure 1:
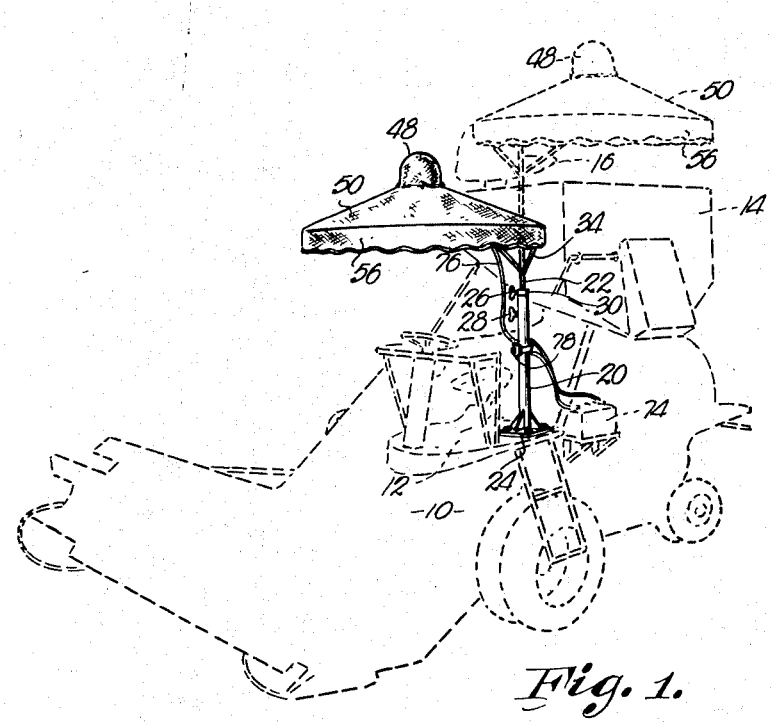
Fig. 1 is a perspective view of a protecting hood for implement drivers showing the same operably mounted upon a combine.
Figure 6:
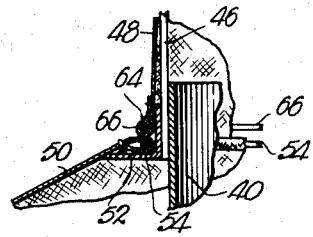

The protecting hood about to be described has been shown in Fig. 1 mounted upon a conventional combine 10, but it is manifest that the use thereof is not intended to be limited to such implements or devices. Combine 10 has an operator's platform 12 upon which the operator either stands or sits to control the combine 10 and/or the tractor motivating means therefor. Combine 10 is, also, provided with a bin 14 into which the grain being harvested is conveyed by means of a hopper 16 leading from the usual conveyor.

Figure 4:
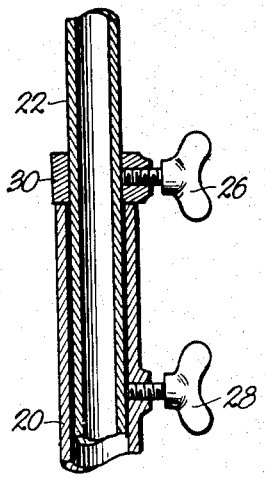
Fig. 4 is a fragmentary, enlarged, central sectional view through a portion of the supporting standard.

The protecting hood forming the subject matter hereof includes an extensible standard broadly designated by the numeral 18 having a pair of sections 20 and 22, the latter of which is telescoped within the tubular section 20 for free, sliding movement therein. The lowermost end of the section 20 has an outturned base flange 24 that may be adapted in any suitable manner for attachment directly to the platform 12. The uppermost and innermost section 22 is selectively held in the desired position by the means of a pair of wing bolts 26 and 28, the latter being threadably carried by the section 20 and extending into engaging relationship with the section 22 as shown in Fig. 4.

Figure 3:
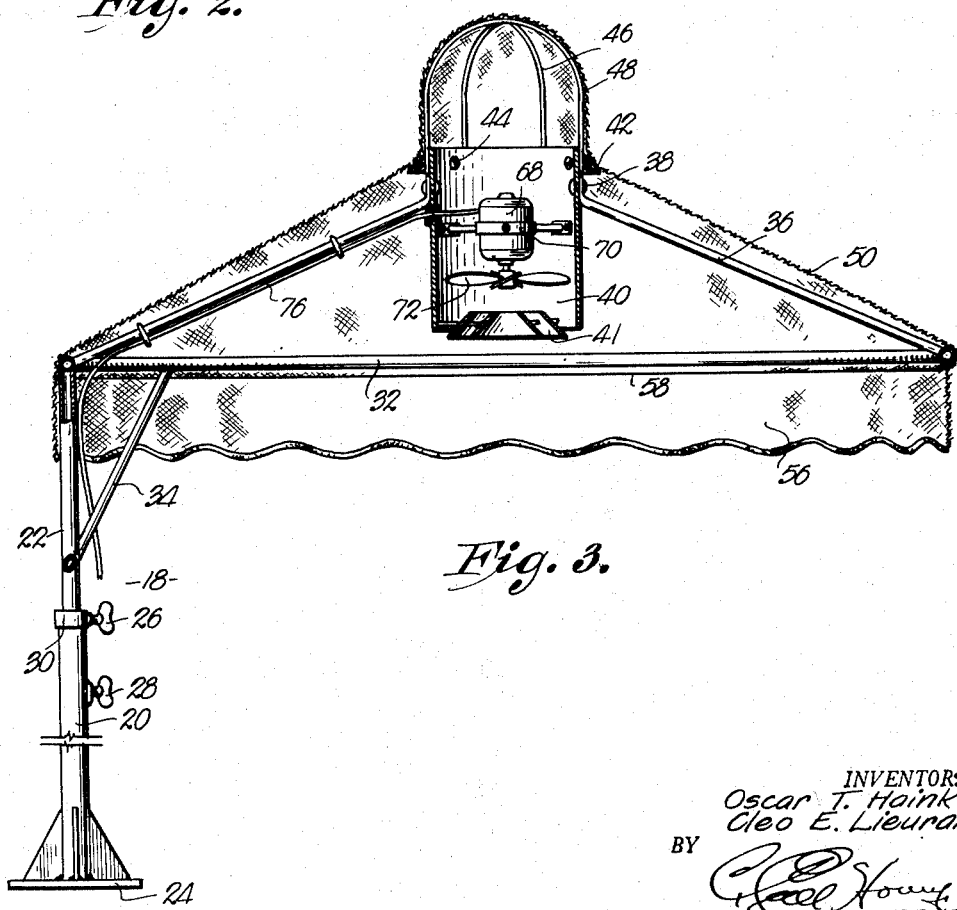
Fig. 3 is a substantially central, vertical, cross sectional view taken on line III—III of Fig. 2.

Section 22 is further held against downward movement by a collar 30 circumscribing the same, and it is within this collar that wing bolt 26 is mounted for releasably holding the collar 30 attached to member 22. Collar 30 normally rests upon the uppermost end of the section 20, as is clearly shown in Figs. 1, 3 and 4.

Figure 2:
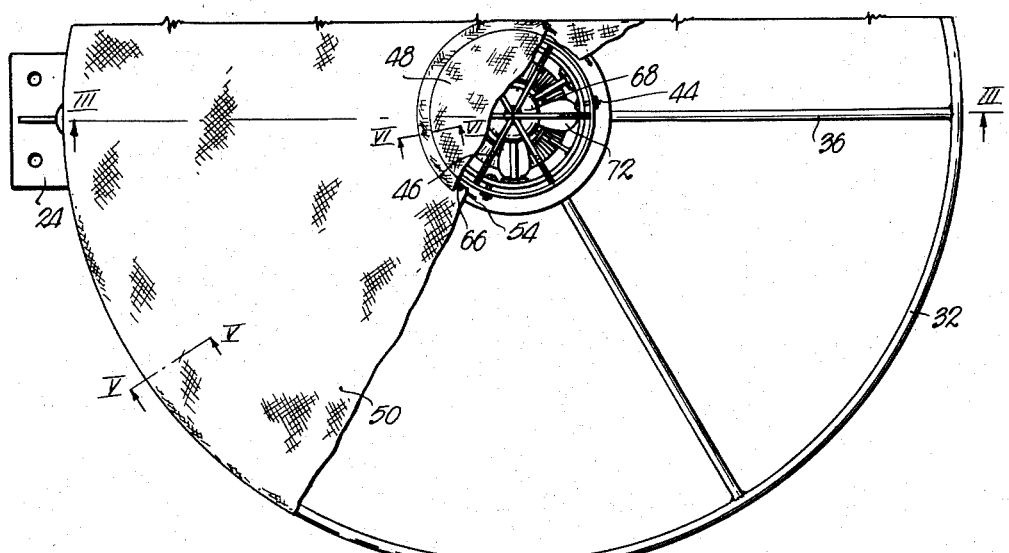
Fig. 2 is an enlarged, fragmentary, top plan view of the protecting hood per se, parts being broken away for clearness.

The uppermost end of the standard 18 and, accordingly, the member 22 has a continuous frame piece 32 secured directly thereto by welding or otherwise, said frame piece 32 being preferably circular as shown in Fig. 2. Frame piece 32 is additionally supported by means of a number of angularly-disposed brace rods 34 extending from the member 22 intermediate the ends thereof and converging outwardly as the frame piece 32 is approached.

A plurality of elongated rib members 36 have the lowermost ends thereof welded or otherwise secured directly to the frame piece 32. Ribs 36 are uniformly arranged about the circumference of frame piece 32 and extend radially inwardly and upwardly at an angle to join at the uppermost ends thereof by rivets, bolts or the like 38 to a tubular member 40. Tube 40 is preferably cylindrical and has both ends thereof open. The point of attachment of ribs 36 is adjacent the uppermost end of the tube 40.

An L-shaped, annular flange 42 is secured to the outermost face of the tube 40 directly above the ribs 36 by means of bolts 44. The flange member 42 serves a three-fold purpose. First, flange 42 serves to mount a plurality of upstanding, U-shaped supports 46 for a filter 48. The free ends of the legs of all of the U-shaped members 46 extend between the flange 42 and the outermost face of tube 40 and are clamped in place by means of the bolts 44. Supporting members 46 are relatively criss crossed as shown in Fig. 2.

Secondly, the L-shaped flange member 42 serves to receive and support the apex end of a flexible hood 50 that is substantially frusto-conical and has an opening at its apex that is of substantially the same diameter as flange 42 and that is defined by a continuous piping 52. Piping 52 receives a draw string 54 which, when pulled tightly about the flange 42, rigidly yet removably secures the uppermost apex end of the hood 50 in place. The material for hood 50 may be of canvas, as is a conventional practice, or other suitable materials capable of shutting out the sun's rays.

Figure 5:
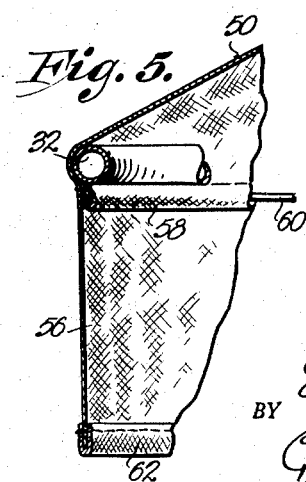
Fig. 5 is a fragmentary, detailed, cross sectional view taken on line V—V of Fig. 2; and, Fig. 6 is a fragmentary, detailed, cross sectional view taken on line VI—VI of Fig. 2.

The base end of the hood 50 completely circumscribes the circular frame piece 32 and extends downwardly therefrom into a continuous flap 56. Flap 56 has a separate piping 58 secured thereto that is continuous and directly underlies the circular frame piece 32 in the manner indicated in Fig. 5.

A draw string 60 is threaded through the piping 58; and, when the same is drawn tightly beneath the frame piece 32, the hood 50 is pulled taut between the frame piece 32 and the tubular member 40. The lowermost edge of the flap 56 has a relatively heavy hem 62 for holding the flap 56 in a vertical, depending relationship to the frame piece 32.

The flange 42, also, serves to mount the dome-shaped filter 48. Filter 48 is formed from a relatively fine mesh, foraminous material, such as fabric, and has its lowermost open end provided with a piping 64 that is, also, provided with a draw string 66. Piping 64 and string 66 circumscribe the flange member 42; and, when drawn tightly, filter 48 is held in place over the supporting members 46.

An electric motor 68 is mounted within the tubular member 40 through the medium of a bracket 70 with its drive shaft disposed vertically and provided with a fan 72 rigidly secured thereto. The blades of the fan 72 are formed to cause a downward movement of air through the tubing 40, when motor 68 is energized through the medium of a battery 74 or like source of electrical energy. Electrical conductors 76 extend from the motor 68 through the tube 40 and downwardly along one of the supporting ribs 36 to which conductors 76 are attached. A switch 78 controls the circuit and flow of electrical energy from battery 74 to the motor 68.

It is noted that the entire protecting hood is mountable upon the platform 12 with the protecting covers 50 directly overlying the operator's position. Accordingly, the cover 50 affords shade for the operator, and he is free to utilize the motor 68 as desired by manipulation of switch 78. When dust tends to collect about the platform 12 and particularly within the cover 50, energization of motor 68 and, therefore, rotation of fan 72, will cause a current of air to be directed downwardly through the lowermost open end of tube 40 to the operator on platform 12.

The air that is moved by fan 72 emanates from above the cover 50, after first passing through the filter 48. Accordingly, the air that is directed to the operator, once cover 50 has been evacuated of dust, is pure and clean. Filter 48 being disposed entirely above the cover 50 renders the same fully exposed to air above the cover 50; and, whether or not dust is prevalent above cover 50 is immaterial, since filter 48 will prevent entrance thereof into the tube 40.

By making the standard 18 extensible, it is possible to adapt the protecting means hereof for an altogether different use in the manner shown by dotted lines in Fig. 1. In the event of sudden rain, the operator can dispose the cover 50 above the grain bin 14 and thereby protect the grain therewithin against wetting. While the filter 48 might permit some entrance of moisture, it is contemplated that the same be of a rather fine mesh and, accordingly, the amount of moisture that will reach the grain in bin 14 will be negligible.

Obviously, it is within the scope of any mechanic to provide a closure for the tube 40 either above or below the motor 68, if desired, and adapted to be used when the protecting hood is to be utilized exclusively as a rain shield. Other changes and modifications are, also, manifestly within the spirit of this invention; and those that fairly come within the scope of the appended claims are contemplated hereby.

The lower or outlet end of tube 40 is preferably provided with circular louvers 41 to effectively diffuse the air over the operator and thereby remove dust over a relatively large area.

Having thus described our invention, what we claim as new and desire to secure by Letters Patent is:

1. A protecting hood of the kind set forth comprising an upright standard; a frame on the standard and extending laterally outwardly from the uppermost end thereof; a frusto-conical cover on the frame having an inlet opening formed therein at its uppermost apex end; an air filter closing said opening; and means on one side of said filter for directing a current of air downwardly through said filter and below said cover, said air filter being dome-shaped, extending upwardly above the cover, and being entirely exposed to free flow of air therethrough throughout its entire area.

2. A protecting hood of the kind set forth comprising an upright standard; a frame on the standard and extending laterally outwardly from the uppermost end thereof; a frusto-conical cover on the frame having an inlet opening formed therein at its uppermost apex end; an air filter closing said opening; means on one side of said filter for directing a current of air downwardly through said filter and below said cover, said air filter being dome-shaped and extending above the cover, exposing the same to free flow of air therethrough throughout its entire area; and a tubular member within said cover and depending from said inlet opening for confining the flow of air current as the same passes through the inlet opening, said filter and said cover surrounding the tubular member at its uppermost end and being attached thereto.

3. A protecting hood of the kind set forth comprising an upright standard; a frame on the standard and extending laterally outwardly from the uppermost end thereof; a frusto-conical cover on the frame having an inlet opening formed therein at its uppermost apex end; an air filter closing said opening; means on one side of said filter for directing a current of air downwardly through said filter and below said cover, said air filter being dome-shaped and extending above the cover, exposing the same to free flow of air therethrough throughout its entire area; a tubular member within said cover and depending from said inlet opening for confining the flow of air current as the same passes through the inlet opening, said means constituting a fan mounted within said tubular member; and means in the tubular member below said fan for diffusing said air outwardly as the same discharges from the lowermost end of the tubular member.

OSCAR T. HAINKE.
CLEO E. LIEURANCE.

REFERENCES CITED

The following references are of record in the file of this patent:

UNITED STATES PATENTS

| Number | Name | Date |
|---|---|---|
| 308,151 | Frey | Nov. 18, 1884 |
| 1,148,332 | Onyskow | July 27, 1915 |
| 1,371,682 | Jacoby | Mar. 15, 1921 |
| 1,503,641 | Davis | Aug. 5, 1924 |
| 1,578,310 | Campbell, Jr. et al. | Mar. 30, 1926 |
| 1,898,859 | Thorp | Feb. 21, 1933 |
| 2,232,108 | Giacomini | Feb. 18, 1941 |
| 2,358,868 | Marx | Sept. 26, 1944 |
| 2,436,508 | Fairbanks | Feb. 24, 1948 |
| 2,493,121 | Ellis | Jan. 3, 1950 |